US012597266B2

(12) United States Patent
Sah et al.

(10) Patent No.: US 12,597,266 B2
(45) Date of Patent: Apr. 7, 2026

(54) LOW POWER PROXIMITY-BASED PRESENCE DETECTION USING OPTICAL FLOW

(71) Applicant: NVIDIA Corporation, Santa Clara, CA (US)

(72) Inventors: Shagan Sah, Santa Clara, CA (US); Niranjan Avadhanam, Saratoga, CA (US); Rajath Shetty, Sunnyvale, CA (US); Ratin Kumar, Cupertino, CA (US); Yile Chen, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 329 days.

(21) Appl. No.: 18/327,643

(22) Filed: Jun. 1, 2023

(65) Prior Publication Data

US 2024/0404296 A1    Dec. 5, 2024

(51) Int. Cl.
*G06V 20/58* (2022.01)
*G06T 7/20* (2017.01)
(Continued)

(52) U.S. Cl.
CPC ............... *G06V 20/58* (2022.01); *G06T 7/20* (2013.01); *G06T 7/50* (2017.01); *G06V 10/764* (2022.01);
(Continued)

(58) Field of Classification Search
CPC ...... G06V 20/58; G06V 20/59; G06V 10/764; G06T 7/50; G06T 7/20;
(Continued)

(56) References Cited

U.S. PATENT DOCUMENTS 10,115,029 B1 * 10/2018 Day et al. ................ H04N 7/18
10,885,698 B2     1/2021 Muthler et al.
(Continued)

FOREIGN PATENT DOCUMENTS

WO    WO2023140990 A1 *  7/2023    ............... G06T 7/70

OTHER PUBLICATIONS

Lau et al., Optimal Estimation of Optical Flow, Time-to-contact and Depth, Sep. 1992 (Year: 1992).*
(Continued)

*Primary Examiner* — Vu Le
*Assistant Examiner* — Matthew James Bodnark
(74) *Attorney, Agent, or Firm* — Shook, Hardy & Bacon L.L.P.

(57) ABSTRACT

In various examples, low power proximity based threat detection using optical flow for vehicle systems and applications are provided. Some embodiments may use a tiered framework that uses sensor fusion techniques to detect and track the movement of a threat candidate, and perform a threat classification and/or intent prediction as the threat candidate approaches approach. Relative depth indications from optical flow, computed using data from image sensors, can be used to initially segment and track a moving object over a sequence of image frames. Additional sensors and processing may be brought online when a moving object becomes close enough to be considered a higher risk threat candidate. A threat response system may generate a risk score based on a predicted intent of a threat candidate, and when the risk score exceeds a certain threshold, then the threat response system may respond accordingly based on the threat classification and/or risk score.

20 Claims, 12 Drawing Sheets

(51) Int. Cl.

| | |
|---|---|
| *G06T 7/50* | (2017.01) |
| *G06V 10/764* | (2022.01) |
| *G06V 20/59* | (2022.01) |
| *G08B 13/196* | (2006.01) |

(52) U.S. Cl.
CPC ....... *G06V 20/59* (2022.01); *G08B 13/19647* (2013.01); *G06T 2207/10028* (2013.01); *G06T 2207/30196* (2013.01); *G06T 2207/30252* (2013.01); *G06T 2207/30268* (2013.01)

(58) Field of Classification Search
CPC . G06T 2207/10028; G06T 2207/30196; G06T 2207/30252; G06T 2207/30268; G08B 13/19647
See application file for complete search history.

(56) References Cited

U.S. PATENT DOCUMENTS

| | | | | |
|---|---|---|---|---|
| 11,602,850 | B2 * | 3/2023 | Lee et al. .................... | B25J 9/16 |
| 2015/0282766 | A1 * | 10/2015 | Cole et al. ............... | A61B 5/00 |
| 2022/0075386 | A1 * | 3/2022 | Deyle et al. | |
| 2023/0373654 | A1 * | 11/2023 | Goyal et al. ........... | B64D 45/00 |

OTHER PUBLICATIONS

"Nvidia Optical Flow SDK", Nvidia, Version: vNVOFA_DA-09418-001_v03, pp. 8 (Nov. 2022).

Lau, H., and Hong, T.-H., "Optimal Estimation of Optical Flow, Time-to-contact and Depth", NIST, U.S. Department of Commerce, pp. 1-52 (Sep. 1992).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", National Highway Traffic Safety Administration (NHTSA), A Division of the US Department of Transportation, and the Society of Automotive Engineers (SAE), Standard No. J3016-201806, pp. 1-35 (Jun. 15, 2018).

ISO 26262, "Road vehicle—Functional safety," International standard for functional safety of electronic system, Retrieved from Internet URL: https://en.wikipedia.org/wiki/ISO_26262, accessed on Sep. 13, 2021, 8 pages.

IEC 61508, "Functional Safety of Electrical/Electronic/Programmable Electronic Safety-related Systems," Retrieved from Internet URL: https://en.wikipedia.org/wiki/IEC_61508, accessed on Apr. 1, 2022, 7 pages.

* cited by examiner

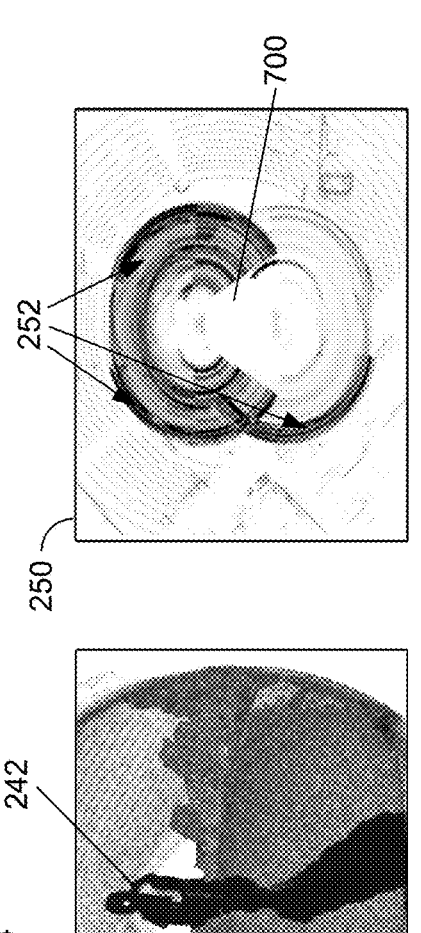
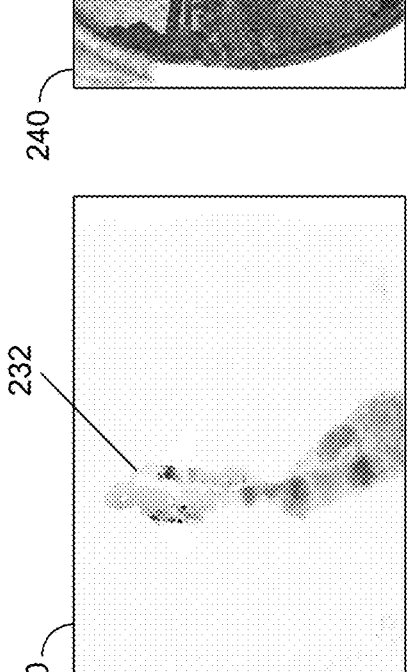
FIGURE 2

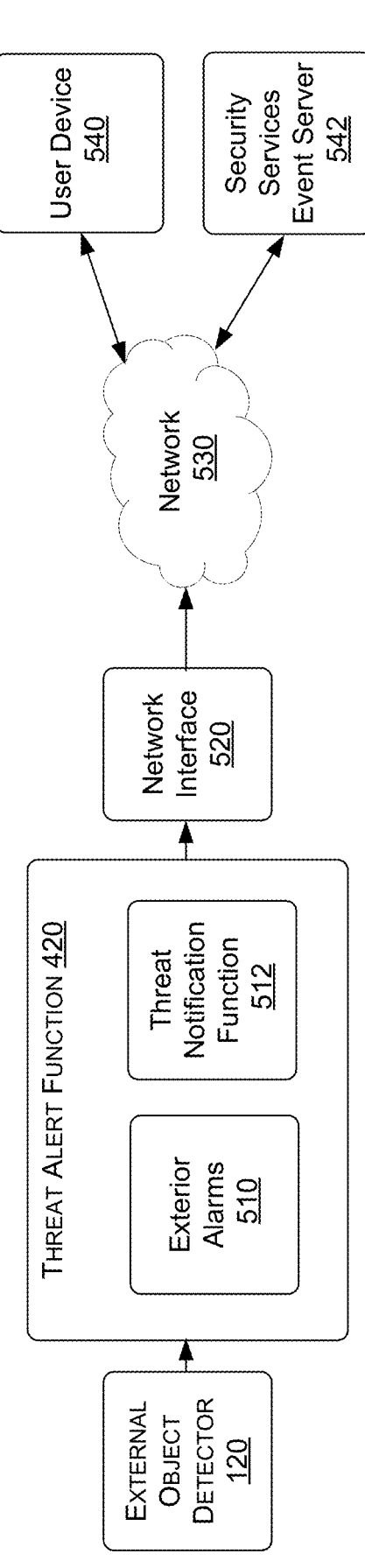
FIGURE 5

600

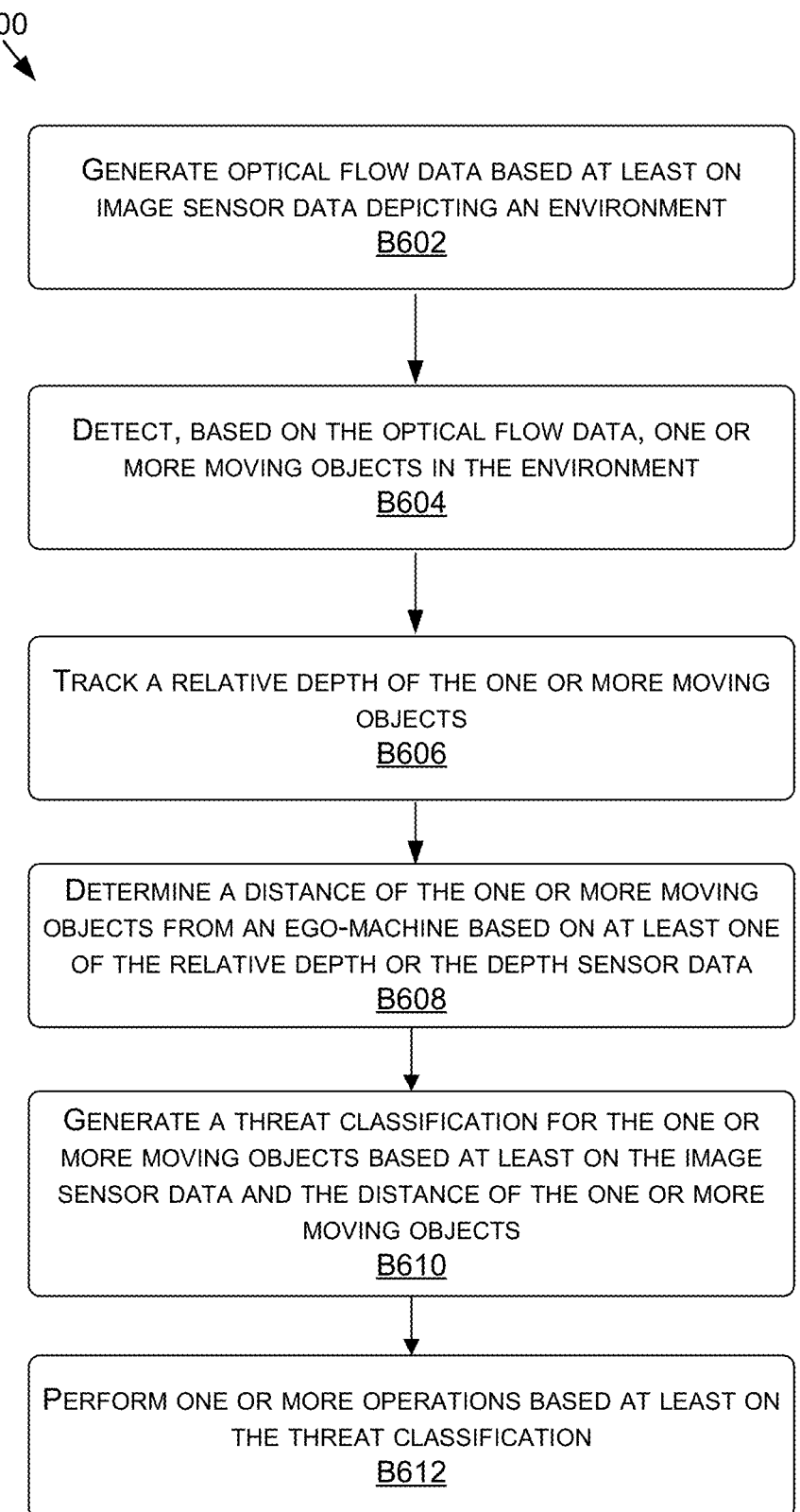

GENERATE OPTICAL FLOW DATA BASED AT LEAST ON IMAGE SENSOR DATA DEPICTING AN ENVIRONMENT
B602

DETECT, BASED ON THE OPTICAL FLOW DATA, ONE OR MORE MOVING OBJECTS IN THE ENVIRONMENT
B604

TRACK A RELATIVE DEPTH OF THE ONE OR MORE MOVING OBJECTS
B606

DETERMINE A DISTANCE OF THE ONE OR MORE MOVING OBJECTS FROM AN EGO-MACHINE BASED ON AT LEAST ONE OF THE RELATIVE DEPTH OR THE DEPTH SENSOR DATA
B608

GENERATE A THREAT CLASSIFICATION FOR THE ONE OR MORE MOVING OBJECTS BASED AT LEAST ON THE IMAGE SENSOR DATA AND THE DISTANCE OF THE ONE OR MORE MOVING OBJECTS
B610

PERFORM ONE OR MORE OPERATIONS BASED AT LEAST ON THE THREAT CLASSIFICATION
B612

SERVER(S) 778

CPU 780(B)

CPU 780(A)

PCIe SWITCH 782(D)

PCIe SWITCH 782(C)

PCIe SWITCH 782(B)

PCIe SWITCH 782(A)

GPU 784(F)

GPU 784(H)

GPU 784(E)

GPU 784(G)

GPU 784(B)

GPU 784(D)

GPU 784(A)

GPU 784(C)

786

788

700

792

794

NETWORK(S) 790

900

LOW POWER PROXIMITY-BASED PRESENCE DETECTION USING OPTICAL FLOW

BACKGROUND

Generally, when a vehicle is parked, components of the vehicle security system operate on battery power and thus contribute to depleting the charge of the vehicle battery. In particular for battery-powered vehicles, consuming energy stored in the vehicle battery while the vehicle is parked has a direct negative affect on remaining available driving distance and/or other for vehicles are often designed to operate within a limited power profile (e.g., within a 10 watt profile). False positive alarm activations that activate alert sirens and/or vehicle lights are one factor that contributes to unnecessary battery drain by security systems. That said, using advanced sensors and signal processing to implement more intelligent security systems to reduce false positive alarm activations can itself increase demand for the energy stored in the vehicle battery. Moreover, there is an increasing interest in vehicle security systems that provide functions such as child presence detection to warn a driver when a child or pet may have been inadvertently left inside a parked vehicle.

Proximity sensing systems are one example of a technology that may be applied to monitor activities around a parked vehicle. When a person or object is sensed entering within a threshold proximity of the vehicle in excess of a period of time, they may be perceived as a security risk, and vehicle alarms may be activated. Some technologies may also record data captured at the time of a suspected event (e.g., such a video images) for post-event analysis (e.g., to either attempt to identify the threat and/or confirm a false positive alarm activation). However, these proximity based systems are susceptible to false positive alarm activations that result in unnecessary power depletion of the vehicle battery.

SUMMARY

Embodiments of the present disclosure relate to low power proximity based threat detection using optical flow for vehicle systems and applications. Systems and methods are disclosed that relate to monitoring activities in the proximity of a parked vehicle, to detect and assess potential risks or threats to the vehicle and/or to occupants inside the vehicle.

In contrast to conventional systems, the systems and methods presented in this disclosure may provide for an external object detector that uses tiered tracking of the proximity of potential security threats (referred to as threat candidates) based on optical flow processes. Some embodiments may use a tiered framework that uses sensor fusion techniques to detect and track the movement of a threat candidate, obtain precise distance information when the threat candidate gets closer to the vehicle, and then perform a threat classification and/or intent prediction as the threat candidate continues to approach. A threat response system may assess a risk score based on a predicted intent of a threat candidate, and when the risk score exceeds a certain threshold, then the threat response system may respond accordingly based on a threat classification and/or risk score. In embodiments, the external object detector uses the optical flow to obtain scaled depth data (which may also be referred to as "time-to-contact data" or "time-to-collision" data), that allows the external object detector to segment the image based on the relative depth differences. The relative depth indications computed using low-power computations, with data from low-power image sensors, can be used to initially segment a closest moving object in the scene and track that object as a threat candidate over a sequence of image frames. Additional sensors and processing may be brought online when a moving object becomes close enough to be considered a threat candidate with a higher associated risk. For example, precision depth data from one or more depth sensors may be used to augment indications from the optical flow vector to obtain more precise information about the moving object perceived as a threat candidate. The external object detector may activate a threat classification model when a threat candidate moves within a proximity threshold. Based on a threat classification and/or risk score assigned to the threat candidate, a threat response system may respond accordingly to generate alarms, generate notifications, and/or activate other systems.

BRIEF DESCRIPTION OF THE DRAWINGS

The present systems and methods for low power proximity based threat detection using optical flow for vehicle systems and applications are described in detail below with reference to the attached drawing figures, wherein:

FIG. 2 is a diagram illustrating example optical flow and depth sensor images, in accordance with some embodiments of the present disclosure;

FIG. 5 is a diagram illustrating an example threat alert function, in accordance with some embodiments of the present disclosure;

FIG. 6 is a diagram illustrating an example method for low power proximity based threat detection using optical flow, in accordance with some embodiments of the present disclosure;

DETAILED DESCRIPTION

Figure 1:
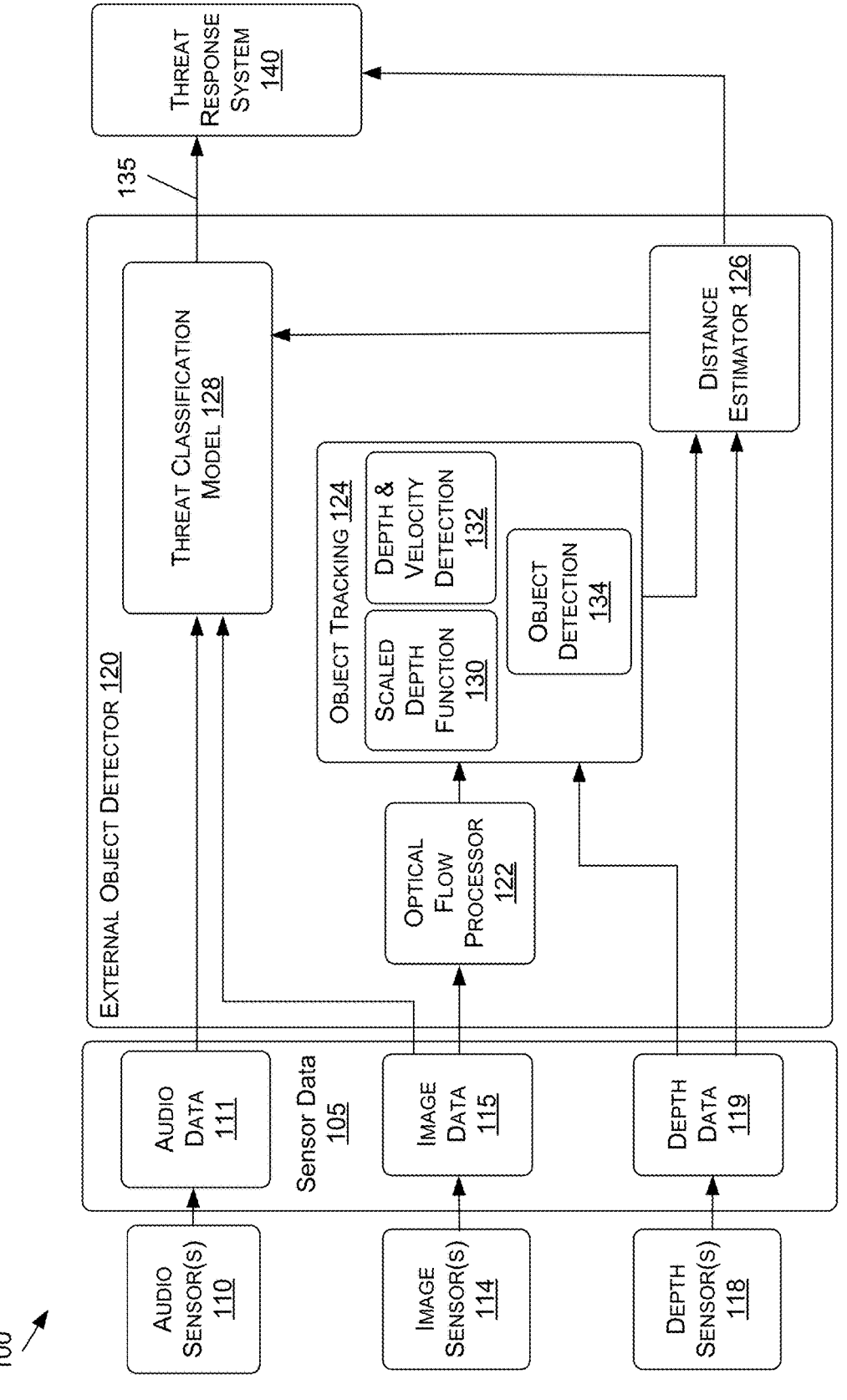
FIG. 1 is a data flow diagram illustrating an example system for low power proximity based threat detection using optical flow, in accordance with some embodiments of the present disclosure.

Systems and methods are disclosed related to low power proximity based threat detection using optical flow for vehicle systems and applications. Although the present disclosure may be described with respect to an example autonomous or semi-autonomous vehicle or machine 700 (alternatively referred to herein as "vehicle 700" or "ego-machine 700," an example of which is described with respect to FIGS. 7A-7D), this is not intended to be limiting. For example, the systems and methods described herein may be used by, without limitation, non-autonomous vehicles or machines, semi-autonomous vehicles or machines (e.g., in one or more advanced driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. In addition, although the present disclosure may be described with respect to sensor based threat detection for parked vehicles, this is not intended to be limiting, and the systems and methods described herein may be used in augmented reality, virtual reality, mixed reality, robotics, security and surveillance, autonomous or semi-autonomous machine applications, and/or any other technology spaces where sensor based threat detection may be used.

Proximity sensing systems are one example of a technology that may be applied to monitor activities around a parked vehicle. When a person or object is sensed within a proximity threshold of the vehicle in excess of a period of time, they may be perceived as a threat and vehicle alarms or other security measures (e.g., notifications to the vehicle owner or security monitoring service may be sent, etc.) may be activated. Some technologies may also record data captured at the time of a suspected event (e.g., such a video images) for post-event analysis (e.g., to either attempt to identify the threat and/or confirm a false positive alarm activation). However, these proximity based systems are susceptible to false positive alarm activations that result in unnecessary power depletion of the vehicle battery.

False positive alarm activations that activate alert sirens and/or vehicle lights are one factor that contributes to unnecessary battery drain by security systems. In particular, for battery powered vehicles, consuming energy stored in the vehicle battery while the vehicle is parked has a direct negative affect on remaining available driving distance. Using advanced sensors and signal processing to implement more intelligent security systems to reduce false positive alarm activations can itself increase demand for the energy stored in the vehicle battery. Moreover, there is an increasing interest in vehicle security systems that provide functions such as child presence detection to warn a driver when a child or pet may have been inadvertently left inside a parked vehicle.

The systems and methods presented in this disclosure provide for tiered tracking of potential threats (referred to as threat candidates) by proximity, using optical flow processes. When the threat candidate comes within a threshold distance from the vehicle, a threat classification may be assigned to the threat candidate, and one or more responses triggered based on the threat classification.

In contrast to existing vehicle security systems technologies, the systems and methods presented in this disclosure may provide for a tiered framework that uses sensor fusion techniques to detect and track the movement of a threat candidate, obtain precise distance information when the threat candidate gets closer to the vehicle, and then perform a threat classification and/or intent prediction as the threat candidate continues to approach. The system may assess a threat classification and/or intent prediction of a threat candidate to translate the intent into a risk score (e.g., an intrusion risk). When the risk score exceeds a certain threshold, then the security system may respond accordingly based on the intent prediction. For example, a prediction that a detected threat candidate is a person that merely intends to walk past the vehicle, or stop before reaching the vehicle, may yield a low risk score even if the person comes within a close proximity. As such, a potential false positive alarm activation is avoided that may have otherwise cause an unnecessary demand for energy from the vehicle battery. In contrast, a prediction that a detected threat candidate is a person that intends to enter or damage the vehicle, may yield a high risk score that justifies, for example, an alarm activation or other threat response. The computation of the risk score and the system's response may take into account other factors determined from an interior monitoring system, such whether there are items, and/or a person, child, or pet within the vehicle as the threat candidate approaches.

In order to manage power demand on the vehicle battery, the security system may comprise an external object detector function that evaluates sensor data based on tiered stages, so that additional on-board resources are applied to assess the risk of a threat candidate as the threat candidate becomes more of a perceived threat. For example, in some embodiments, the external object detector may receive image sensor data from low power image sensors (e.g., cameras) that obtain image frames of the environment around the exterior of the vehicle, and use that image sensor data to perform preliminary threat proximity detection and tracking tasks. As opposed to proximity sensors that first transmit energy into the environment and then evaluate a reflected return signal, image sensors may passively observe the environment based on ambient light that reflects from objects in the environment onto the image sensor, and thus demand less energy from the vehicle battery to function. In some embodiments, the external object detector uses sequential image frames from the image sensor data to compute an optical flow, and then uses the optical flow to estimate a relative depth of different segmentations of voxels to detect the presence of a moving object that may present a threat. The external object detector may thus use optical flow to develop a notion (e.g., a rough approximation) of the proximity of a moving object to the vehicle.

For example, in some embodiments, the external object detector uses the optical flow to obtain scaled depth data (which may also be referred to as "time-to-contact data" or "time-to-collision" data), that allows the external object detector to segment the image based on the relative depth differences. Given a parked vehicle and an object or group of objects approaching an image sensor, optical flow vectors for segments of the image corresponding to moving objects that are closer to the image sensor will seem to move faster compared to optical flow vectors for segments corresponding to distant moving objects which appear to move slowly. Measurable differences in the speeds indicated by these vectors for different objects may be used determine a relative depth of moving objects with respect to the image sensor.

In some embodiments, an optical flow processor inputs sequential image frames from the image sensor data to determine an origin of optical flow corresponding to a moving object appearing in the image frames. The optical flow processor may calculate flow vectors indicating motion between two sequential image frames with respect to voxel positions. This origin of optical flow for a moving object may also be referred to as the focus of expansion that defines a point where optical flow is minimal and from which an optical flow vector appears to originate. In some embodiments, the optical flow is defined as flowing in a direction away from the focus of expansion. In some implementations, the focus of expansion in an image may be determined by finding common intersection points of individual flow vectors in the image. The optical flow processor computes a length of the optical flow vectors to estimate a velocity of image pixels corresponding to the moving object, and the distance from the pixel to the focus of expansion provides a value corresponding to a relative depth. With these two values, a scaled depth value (which may be referred to as a time-to-contact quantity) may be computed and used as a proxy for relative depth of various segments in the image. The relative depth can be used to segment a closest moving object in the scene and track that object as a threat candidate over a sequence of image frames. With respect to power consumption, the optical flow computations by the optical flow processor represent a computer vision task that places a relatively lesser intensive computational burden on processing resources powered by the vehicle battery, for example, as compared to executing a machine learning model (e.g., a deep neural network (DNN)) to perform a computer vision image segmentation task to detect, classify, and track an object that may be a potential threat. In some embodiments, the optical flow processor may be implemented by an Optical Flow Accelerator (OPA) engine, which may include a hardware device and/or set of algorithms configured for performing efficient optical flow computations.

As mentioned, optical flow computations may generate optical flow vectors that represent estimates of the relative depth of moving object in an image. For example, the optical flow vectors may be evaluated to identify when one moving object is moving towards the vehicle at a faster rate than another moving object, and/or is closer to the vehicle than other moving objects. In some embodiments, when a trend in relative depth indicates that an object moving towards the vehicle may be a threat candidate (e.g., based on value of an optical flow vector crossing an initial proximity threshold), the external object detector may initiate multi-modal sensing to obtain more precise distance measurements. The relative depth indications computed using low-power computations, with data from low-power image sensors, can be used to initially segment a closest moving object in the scene and track that object as a threat candidate over a sequence of image frames.

Additional supplemental sensors and processing may be brought online when a moving object becomes close enough to be considered a higher risk threat candidate. For example, precision depth data from one or more depth sensors may be used to augment indications from the optical flow vector to obtain more precise information about the moving object perceived as a threat candidate. Example depth sensors for obtaining the depth data may include, but are not limited to, ultrasonic sensors, LiDAR sensors, and/or depth sensing cameras. In some embodiments, depth data may be used in conjunction with optical flow vectors to more precisely detect the depth and velocity and thus more precisely segment the image to discern voxels for a threat candidate from the background and/or from each other. With the segment of the image corresponding to the threat candidate more precisely defined, the external object detector may more precisely compute a distance between the vehicle and the threat candidate. For example, an ultrasonic sensor may emit ultrasonic waves that radiate into the environment. A portion of those ultrasonic waves that are reflected back from an object may be received by the ultrasonic sensor. The ultrasonic sensor may then compute a distance to that object (e.g., based on time delay, frequency shift and/or phase shift) that can be correlated to the threat candidate. For example, the external object detector may use the depth data from an ultrasonic sensor, which may indicate a distance to a closest object within the arc of a field of view of that ultrasonic sensor, and correlate that depth data with the closest moving segment of the image frame (e.g., the threat candidate) as discerned from optical flow, to establish a precise distance and/or velocity of the threat candidate. In some embodiments, depth sensors may be selectively activated to capture and/or record depth data based on the threat candidate's position with respect to the vehicle (e.g., by selectively activating depth sensors on the side of the vehicle where the threat candidate is detected).

In some embodiments, once a precise depth and/or velocity is determined for a threat candidate, the external object detector may remain in that first elevated tier of operation and continue to track the depth and/or velocity of the threat candidate until it begins to move away from the vehicle or otherwise vanishes from the optical flow. However, in some instances, the threat candidate may continue to move towards the vehicle and cross within a closer proximity threshold of the vehicle that triggers the external object detector to a higher tier of operation. In this second (elevated) tier of operation, the external object detector may activate a threat classification model. For example, the threat classification model may input a live stream of the image sensor data and evaluate the images to infer whether the threat candidate is a person, animal, or other object (e.g., such as part of a falling tree or a wayward shopping cart). Moreover, when the threat candidate is identified as a person, the threat classification model may attempt to perform a facial recognition (e.g., to determine if the person is a registered user of the vehicle), and/or to infer the person's intent in approaching the vehicle. For example, in some embodiments, the threat classification model may include a body pose classification model that may be implemented, for example, by a neural network (e.g., a deep neural network (DNN)) trained to infer an intent based on body poses and/or movements.

As an example, the threat classification model may be trained to detect patterns in the relative position and/or movements of key points on a human body, such as joint locations. The threat classification model may detect the positions of multiple key points (e.g., such as knees, hands, palms, elbows, and shoulders). The threat classification model may compute affinity estimates and confidence values for the joints, determining which joints are closer to the vehicle, and infer an intent of the person(s) based on an assessment of their pose. The threat classification model may assess a direction of movement of one or more of the key points, to whether the person(s) is about to strike or otherwise cause damage to the vehicle, reach into the vehicle, or otherwise act in a threatening behavior. For example, the directionality and position of the detected joints may be observed over a few frames of image data and the threat classification model may kinematically evaluate the image frames to generate a predication of intent. In some embodiments, the threat classification model may further receive audio data as input from one or more audio sensors, and utilize the audio data to infer an intent of the threat candidate. For example, threatening behavior combined with shouting or the sound or breaking glass may increase confidence that an observed behavior is a high threat risk. Accordingly, in many cases a threat classification may be generated for a particular threat candidate before any event actually happens, permitting the external object detector to activate a threat response system (e.g., an alarm) in time to potentially deter the event from happening, and/or at least record data (e.g., such as image and/or other sensor data) to document the event.

With respect to power consumption, executing the threat classification model may consume considerably more power from the vehicle battery than simply performing optical flow object tracking and/or distance estimation using depth sensors. However, since the threat classification model may be activated on an on-demand basis triggered by a threat candidate entering within a predetermined proximity of the vehicle, the increased power usage is justifiable given the context of the increased perceived risk to the vehicle. Otherwise, without a threat candidate appearing within the proximity threshold, the external object detector function remains in a lesser power tier of operation.

In some embodiments, the external object detector operates in conjunction with a threat response system that reacts to the threat candidate with a response commensurate to a level of perceived risk. For example, in one instance, a threat classification model may evaluate image data and classify a detected threat candidate as being an inanimate object, and/or infer that the inanimate object is not likely to strike the vehicle. In a second instance, the threat classification model may evaluate image data and classify a detected threat candidate as being an inanimate object and/or infer that the inanimate object is likely to strike the vehicle. The threat response system may assess the risks associated with these two instances and assign an appropriate risk score. For example, where the threat candidate is an inanimate object predicted to avoid contact with the vehicle, the threat response system may assign a low risk score and/or respond by merely logging the instance, which may, for example, include recording an image frame or segment of video to memory. Where the threat candidate is an inanimate object that is predicted to collide or otherwise come into contact with the vehicle (and countermeasures such as an alarm are unlikely to alter that outcome), the threat response system may assign a higher risk score and/or begin recording of video streams and/or other sensor data to capture the event (e.g., for insurance or other reporting purposes). When the threat classification model determines that the threat candidate is an animate being, such as a person or animal, other responses by the threat response system may be appropriate. For example, where the threat classification model determines that the threat candidate is an animal in close proximity to the vehicle, the threat response system may assign a different high risk score that triggers both reporting and countermeasure actions. That is, the threat response system may begin recording of video streams and/or other sensor data to capture the event (e.g., for insurance or other reporting purposes), and/or activate exterior alarm devices (e.g., sirens and/or lights) to frighten the animal away.

For instances where the threat candidate is identified by the threat classification model as being a person, the threat classification model may output a threat classification that further indicates a predicted intent of the person (e.g., which may be inferred based on a body pose model). Based on an inference that the person does not have an intent that poses a threat to the vehicle (e.g., the threat classification model infers that the person intends to walk past the vehicle and/or enter another nearby vehicle), the threat response system may assess a (relative) low to medium threat score (e.g., which may trigger logging the instance) while the external object detector continues to track the threat candidate. In contrast, the classification may instead predict that the person has an intent that poses a threat to the vehicle, and the threat response system assesses a high risk score to that threat candidate. For example, a high risk score may be assigned to the threat candidate when the threat classification model classifies the threat candidate as intending to collide or otherwise come into contact (e.g., strike) the vehicle, smash a window, open a vehicle door or hatch, and/or reach into the vehicle interior. The high risk score may trigger the threat response system to perform one or more operations such as: 1) begin recording of video streams and/or other sensor data to capture the event, 2) activate external alarm devices, and/or 3) transmit notifications to a user device of the vehicle owner and/or a security service. In some embodiments, such notifications may include sensor data and/or streaming video of the event. Moreover, external alarms may be directed in the direction of the threat candidate by selectively activating external alarm devices based on the threat candidate's position with respect to the vehicle. Similarly, sensor and image data may be selectively captured and/or recorded based on the threat candidate's position with respect to the vehicle.

In some embodiments, the threat classification model may further compute and output a confidence value for threat classifications. The confidence value may indicate to the threat response system the threat classification model's confidence in the accuracy of the classifications and/or intent inferences that it generates. The threat response system, in some embodiments, may incorporate the confidence value into the risk it associates with a particular threat candidate. For example, in order to avoid false positives and an unnecessary drain on the vehicle battery, the threat response system may respond to threat candidates associated with high confidence values, and/or may adjust the risk score as a function of the confidence value. For example, the threat response system may either upgrade or downgrade a risk score when the threat classification model has a relatively low confidence in its assessment of a threat candidate.

In some embodiments, threat classifications generated by the external object detector function may be used in conjunction with other functions, such as but not limited to interior monitoring systems, occupant monitoring systems, and/or child protection systems. For example, in some embodiments, based on the threat classification and/or risk value assigned to a threat candidate, one or more interior sensors may be activated to capture images and/or further assess the actions of the threat candidate. For example, the threat response system may trigger an object detector function to compile an inventory of objects that were in the vehicle interior before and after an event occurs. The inventories may be used to identify specifically what items may have been removed during a vehicle break-in event. In some embodiments, the inventories and/or other data captured by interior and/or exterior sensors, may be compiled or otherwise collected and aggregated into an intrusion report generated by the threat response system. In some embodiments, the intrusion report may provide data for further analysis after the event (e.g., documenting damage and/or stolen items, applying facial recognition, license tag recognition, or other evaluations). By triggering activation of the interior systems in response to risks associated with threat candidates identified by the external object detector, the sensors, neural network algorithms, and other processes of the internal monitoring system may be triggered on an on-demand basis that conserves power until a threat is detected that actually warrants activation of those interior monitoring systems. In some embodiments, one or more interior monitoring system may feed data back to the threat response system, which may further adjust the risk value and/or response operation based on the interior monitoring system data. For example, the threat response system may raise the risk value for a threat candidate to a higher risk value based on there being one or more items and/or a person (and/or pet), within the vehicle interior, as opposed to an empty interior.

In some embodiments, threat classifications generated by an external object detector function may be used in conjunction with child protection systems such as child presence detection system that functions to warn a driver when a child (and/or pet) may have been inadvertently left inside a parked vehicle. For example, when a child presence detection system detects that a child may have been inadvertently left within a parked vehicle, the threat response system may selectively activate exterior alert system based at least on whether threatening activity is detected outside the vehicle. For example, when the threat classification model determines that a nearby threat candidate is actually a person with non-threatening intent, the threat response system may activate an external speaker in the direction of the person to alert them of the child and request assistance. In some embodiments, the threat classification model can determine (e.g., through facial recognition) whether the nearby person is a family member and/or other authorized person registered with the vehicle. For example, the response system may broadcast to the person information regarding the location and/or contact information of the vehicle driver (e.g., based on a reported location of the vehicle driver's smart device), and/or other information such as the air temperature inside the vehicle. In other embodiments, if a threat candidate is identified by the threat classification model as posing a perceived threat to the vehicle and/or child, the threat response systems may activate external alarms to bring attention to the area and encourage the threat candidate to immediately leave the area. The threat response system may further trigger operations to capture and record sensor data and/or interior and/or exterior images to document the encounter. In some embodiments, the threat response system may upwardly adjust the risk score as a function when a child is detected in a vehicle.

The external threat detection function, threat response system, and corresponding methods may be executed at least in part on one or more processing units coupled to a memory. The processing unit(s) are programmed to execute code to implement one or more of the features and functions of the external threat detection function and/or threat response system to detect and track one or more threat candidates and assess the level of risk posed by those threat candidates. While in some embodiments, processing is performed using onboard resources, in other embodiments, features and functions of these functions may be distributed and performed by a combination of onboard processors and cloud computing resources.

With reference to FIG. 1, FIG. 1 is an example data flow diagram for a system 100 for low power proximity based threat detection using optical flow, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 700 of FIGS. 7A-7D, example computing device 800 of FIG. 8, and/or example data center 900 of FIG. 9.

As shown in FIG. 1, the threat detection system 100 may include an external object detector 120 that receives sensor data 105 from one or more sensors, such as but not limited to, one or more image sensors 114, one or more depth sensors 118, and/or one or more audio sensors 110, and may provide a threat classification output 135 for use by a threat response system 140 to trigger one or more threat response operations. To detect and track one or more threat candidates, the external object detector 120 may input image data 115 generated by at least one image sensor 114 and depth data 119 generated by at least one depth sensor 118.

The external object detector 120 may receive image sensor data 115 from low power image sensors 114 (e.g., cameras) that obtain image frames of the environment around the exterior of the vehicle 700, and use that image sensor data 115 to perform preliminary threat proximity detection and tracking tasks. The image sensor(s) 114 may comprise a camera module such as, but not limited to, any of the cameras discussed with respect to FIGS. 7A-7D. An image sensor 114 may comprise, for example, a monocular camera, a surround camera, wide-view camera, a fisheye camera, a long-range camera, a mid-range camera, a stereo camera, a LIDAR sensor, and/or other image sensors. Example depth sensors 118 for obtaining the depth sensor data 119 may include, but are not limited to, ultrasonic sensors, LiDAR sensors, and/or depth sensing cameras (e.g., cameras discussed with respect to FIGS. 7A-7D). In some embodiments, the external object detector 120 comprises an optical flow processor 122 that uses a sequence of two or more image frames from the image sensor data 115 to compute an optical flow. The optical flow processor 122 may be implemented using an Optical Flow Accelerator (OPA) engine, for example.

For example, the optical flow processor 122 may input a plurality of image frames from the image sensor data 115, such as the image frames shown in FIG. 2 at 210 and 220 of a moving object 212 (a person in this example) approaching the vehicle 700. From the image frame, the optical flow processor 122 applies (e.g., executes) one or more optical flow algorithms to determine an origin of optical flow corresponding to the moving object 212 appearing in the image frames 210, 220. The origin of optical flow for the moving object 122 may also be referred to as the focus of expansion that defines a point where optical flow is minimal, and from which optical flow vectors appear to originate. The optical flow processor 122 may calculate optical flow vectors indicating motion between sequential image frames with respect to voxel positions and the origin of optical flow to produce an optical flow image as shown at 230, where an optical flow 232 corresponding to moving object 212 appears as flowing in a direction away from the focus of expansion. In one or more embodiments, the optical flow processor 122 computes a length of the optical flow vectors for pixels corresponding to the moving object 212 to estimate a velocity of image pixels corresponding to the moving object 212. In one or more embodiments, the optical flow processor 122 computes a distance from the pixels to the origin of optical flow to estimate a relative depth of the moving object 212 with respect to the image sensor 114 capturing the image frames 210, 220.

Based on the relative pixel depth and estimated velocity of image pixels corresponding to the moving object 212, the external object detector 120 may initiate object tracking 124. For example, a scaled depth value may be computed (e.g., a time-to-contact quantity) to produce a scaled depth image 240 and used to represent the relative depth of various segments of the scene captured by the image frames 210, 220. For example, scaled depth image 240 illustrates a relative difference in depth between pixels corresponding to the moving object 212 (shown at 242) and pixels corresponding to other/background elements (shown at 244). A relative depth image produced by the scaled depth function 130, and depicted by the scaled depth image 240, may be used to segment a closest moving object in the scene (e.g., moving object 212) and track that object as a threat candidate over a sequence of image frames. That is, the optical flow processor 122 may generate optical flow vectors that represent estimates of the relative depth of the moving object 212 as compared background and/or other objects appearing in the image frames 210, 220. The optical flow vectors from optical flow processor 122, may be evaluated by scaled depth function 130 to identify when a moving object (e.g., moving object 212) is moving towards the vehicle 700 faster than other objects, and/or is closer to the vehicle 700 than other moving objects.

For example, in some embodiments, the scaled depth function 130 uses optical flow vectors from the optical flow processor 122 to obtain time-to-contact data (which may also be referred to as "time-to-collision" data), that allows the object detection 130 to segment the image frames based on the relative depth differences. Optical flow vectors for segments of the image frames corresponding to moving object 212 that are closer to the image sensor 114 may have greater velocities as compared to optical flow vectors for segments of the image frames corresponding to distant moving objects. Measurable differences in the speeds indicated by these vectors for different objects may be used to determine a relative depth of moving objects with respect to the image sensor.

In some embodiments, the object tracking 124 may track the movement of moving object 212 over time. The relative depth indications—computed using relatively low-power optical flow computations, with data from low-power image sensors 114—can be used to initially segment the moving object 212 from other elements in the scene, and to track that object as a threat candidate over a sequence of image frames. When a trend in the relative depth corresponding to moving object 212 indicates that it may be a threat candidate (e.g., based on value of an optical flow vector and/or relative depth estimate crossing an initial proximity threshold), the external object detector 120 may initiate multi-modal sensing to obtain more precise distance measurements from the moving object 212.

When multi-modal sensing is initiated, the external object detector 120 may activate additional supplemental sensors and processing resources. For example, external object detector 120 may begin to input precision depth data 119 from one or more activated depth sensors 118. Object tracking 124 may use the depth data 119 to augment indications from optical flow vectors to compute more precisely depth and velocity information about the moving object 212 (e.g., which is now perceived as a threat candidate based on exceeding the initial proximity threshold). As an example, depth data 119 may be used in conjunction with optical flow vectors by depth and velocity detection 132 to more precisely detect a depth and velocity for the moving object 212. Using the depth and velocity for the moving object 212, moving object detection 134 may correlate image pixel locations with the depth and velocity data for the moving object 212, and thus more precisely segment the optical flow image 230 and/or scaled depth image 240 to discern pixels corresponding to the threat candidate (e.g., moving object 212) from the background and/or from each other.

With the segment corresponding to the moving object 212 more precisely defined, a distance estimator 126 may more precisely compute a distance between the vehicle 700 and the moving object 212. For example, the distance estimator 126 may use the depth data 119 from depth sensors 118 (e.g., such as an ultrasonic sensor), which may indicate a distance to a closest object within the arc of a field of view of that depth sensors 118, and correlate that depth data 119 with and output from object tracking 124 that defines a set of pixels of the image frames 210, 220 as corresponding to a closest moving segment of the image frames (e.g., corresponding to moving object 212), to compute a precise distance and/or velocity of the moving object 212 from the vehicle 700. In some embodiments to conserve energy usage, depth sensors 118 providing the depth data 119 may be selectively activated to capture and/or record depth data based on the moving object's position with respect to the vehicle (e.g., by selectively activating depth sensors 118 on the side of the vehicle 700 where the moving object 212 is detected). For example, the distance estimator 126 may use the depth data 119 from depth sensors 118 (e.g., such as an ultrasonic sensor) as further shown in FIG. 2 as depth data image 250. For example, depth sensors 118 may emit ultrasonic waves in various directions that radiate into the environment away from the body of vehicle 700. A portion of those ultrasonic waves that are reflected back from an object may be received by the ultrasonic sensor depth sensors 118, which may generate depth data 119 (shown in depth data image 250 as arcs 252), indicating than an object located within a field of view of at least one individual depth sensor 118 (represented by the length of an arc 252) reflected back a signal to the depth sensors 118 at a depth from the vehicle 700 (indicated by depth data image 250). In some embodiments, the arcs 252 may further incorporate a value indicating a relative signal strength and/or phase of the waves reflected back from the environment to the depth sensor 118. The depth sensors 118 may thus compute a distance to moving object 212 based on time delay, frequency shift and/or phase shift of the initial signal broadcast into the environment by the depth sensors 118.

Distance estimator 126 may use the depth data 119 to determine a distance to a closest object within the arc of a field of view of a depth sensor 118, and correlate that depth data 119 with the closest moving segment of the image frame (e.g., moving object 212) as discerned from optical flow, to establish a precise distance and/or velocity of the moving object 212. The external object detector 120 may remain in a first tier of operation and continue to track the depth and/or velocity of the threat candidate based on the precise depth and/or velocity for the moving object 212 determined by the distance estimator 126. The external object detector 120 may continue to track the moving object 212 until it appears to be moving away from the vehicle 700 or otherwise vanishes from the optical flow.

When the moving object 212 continues to move towards the vehicle 700 and crosses within a second proximity threshold, the external object detector 120 may initiate a second tier of operation. In this second tier of operation, the external object detector 120 may activate a threat classification model 128. For example, the threat classification model 128 may input a stream of the image sensor data 115 (e.g., a live image stream) and evaluate the images to assign a threat classification to the moving object 212. In some embodiments, the threat classification model 128 may incorporate the precise distance and/or velocity data corresponding to the moving segment of the image frames (e.g., as provided by the distance estimator 126) that includes the moving object 212 and assign a threat classification to one or more elements appearing in the image sensor data 115 that appear in that segment.

For example, the threat classification model 128 may evaluate the moving segment based on the image sensor data 115 and/or distance and/or velocity data from distance estimator 126 to infer whether the moving object 212 may be classified as a person, animal, or other object (e.g., such as part of a falling tree or a wayward shopping cart). Moreover, for a person, the threat classification 128 model may attempt to perform a facial recognition (e.g., to determine if the moving object 212 is a person that is a registered user of the vehicle), and/or to infer the person's intent in approaching the vehicle.

Figure 3:
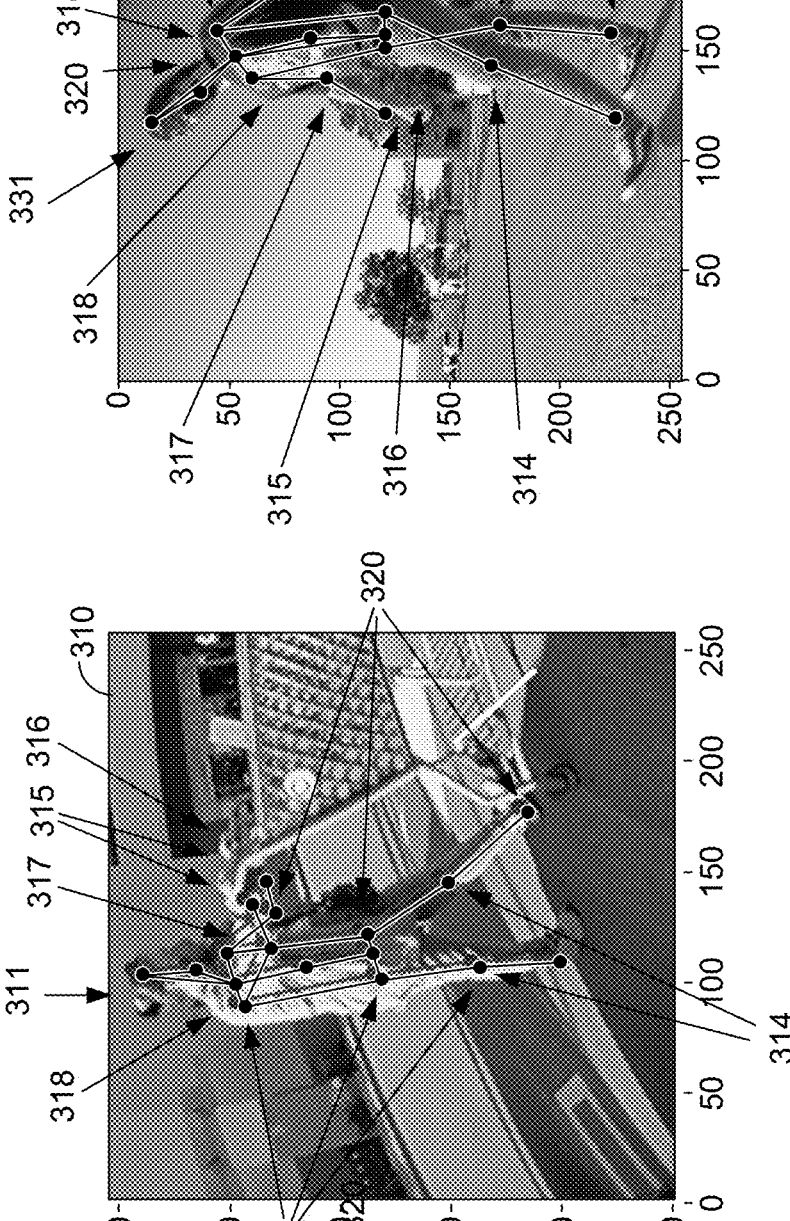
FIG. 3 is a diagram illustrating example body pose based thread detection, in accordance with some embodiments of the present disclosure.

In some embodiments, the threat classification model 128 may include a body pose classification model that may be implemented, for example, by a neural network (e.g., a deep neural network (DNN)) trained to infer an intent based on body poses and/or movements. As an example, the threat classification model may be trained to perform body pose key-point estimation and detect patterns in the relative position and/or movements of key points on a human body, such as joint locations. For example, referring now to FIG. 3, FIG. 3 illustrates example input image frames 310 and 330, which may be evaluated by the threat classification model 128 to perform body pose key-point estimation, infer an intent based on body poses and/or movements, and assign a threat classification to threat candidate based on those assessments. For example, the threat classification model 128 may detect positions of multiple key points such as, but not limited to, a person's knees 314, hands 315, palms 316, elbows 317, shoulders 318 and/or one or more body joints 320. The threat classification model 128 may compute affinity estimates and confidence values for one or more body joints 320, determining which body joints 320 are closer to the vehicle 700, and infer an intent of the person based on an assessment of their pose. The threat classification model 128 may assess a direction of movement of one or more of the key points, to whether the persons is about to come into contact with (e.g., strike or collide, etc.) the vehicle, reach into the vehicle, or otherwise act in a threatening behavior. For example, the directionality and position of the detected joints 320 may be observed over a few image frames of image data 115 and the threat classification model 128 may kinematically evaluate the image frames to generate a prediction of intent.

In some embodiments, the threat classification model 128 may further utilize other sensor data 105 to infer an intent of a threat candidate. For example, the threat classification model 128 may receive audio data 111 from one or more audio sensors 110 (e.g., such as an external microphone), and utilize the audio data 111 to infer an intent of the threat candidate. For example, inferred threatening motions combined with shouting or the sound or breaking glass may increase the confidence value of a threat classification by the threat classification model 128 classifying the threat candidate as a high threat risk. Accordingly, in many cases a threat classification may be generated by the threat classification model 128 for a particular threat candidate before any physical assault or other harmful activity on the vehicle 700 actually happens, permitting the external object detector to activate a threat response system 140 in time to potentially deter the event from happening, and/or record data (e.g., such as image and/or other sensor data) do document the event. That said, the power consumed by the eternal threat detector 120 is efficiently managed by adjusting its level of operation commensurate with a level of risk associated with a perceived threat candidate. Executing the threat classification model 128 may consume more power from the vehicle battery than just performing optical flow object tracking and/or distance estimation using depth sensors. However, since the threat classification model 128 may be activated on an on-demand basis triggered by a threat candidate entering within a predetermined proximity of the vehicle, the increased power usage is justifiable given the context of the increased perceived risk to the vehicle.

Figure 4:
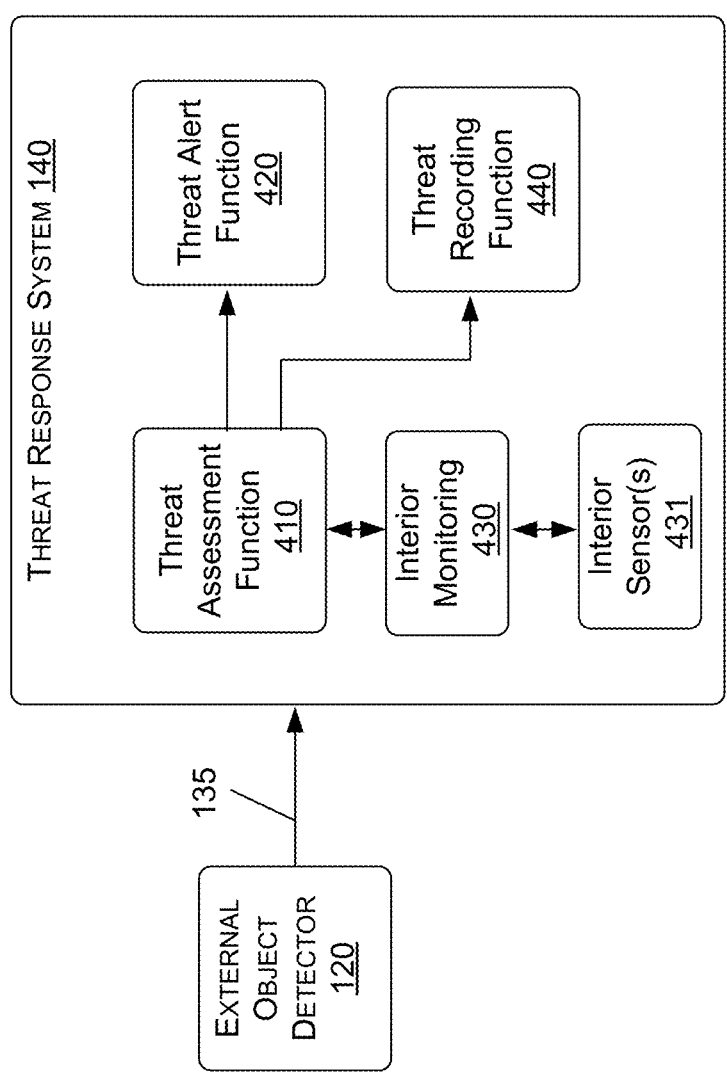
FIG. 4 is a diagram illustrating an example threat response system, in accordance with some embodiments of the present disclosure.

As previously mentioned, the threat detection system 100 may include an external object detector 120 that receives sensor data 105 from one or more sensors and provides a threat classification output 135 for use by a threat response system 140. As shown in FIG. 4 at 400, the external object detector 120 may operate in conjunction with elements of a threat response system 140 to react to a threat candidate with a response commensurate to a level of perceived risk. For example, the threat response system 140 may include a threat assessment function 410 that evaluates a threat classification output 135 from the external object detector 120 for a threat candidate. In response, the threat response system 140 may trigger activation of one or more security functions such as, but not limited to, a threat alert function 420, an interior monitoring function 430, and a threat recording function 440. In some embodiments, the threat classification model 128 may further include a confidence value with the threat classification outputs 135. The confidence value may indicate to the threat response system 140 a level of confidence in the accuracy of the classifications and/or intent inferences generated by the threat classification model 128. The threat response system 140, in some embodiments, may incorporate the confidence value into the risk it associates with a particular threat candidate. For example, in order to avoid false positives and an unnecessary drain of the vehicle battery, the threat response system 140 may only respond to threat candidates associated with high confidence values, and/or may adjust the risk score as a function of the confidence value. For example, the threat response system 140 may selectively upgrade, or downgrade, a risk score associated with a threat candidate when the threat classification model 128 has a relatively low confidence in its assessment of the threat candidate.

For example, in one instance, a threat classification model 128 may generate a threat classification output 135 that classifies a detected threat candidate as being an inanimate object and/or infer that the inanimate object is not likely to strike the vehicle. In a second instance, the threat classification model 128 may generate a threat classification output 135 that classifies a detected threat candidate as being an inanimate object and/or infer that the inanimate object is likely to strike the vehicle. The threat assessment function 410 may assess the risks associated with these two instances and threat classifications and assign an appropriate risk score.

For example, where the threat candidate is an inanimate object or animal predicted to not strike the vehicle, the threat assessment function 410 may assign a low risk score and/or respond by merely logging the instance, which may, for example, include activating the threat recording function 440 to record an image frame or segment of image data 115 video to memory. Where the threat candidate is an inanimate object that is predicted to strike the vehicle (and counter-measures such as an alarm are unlikely to alter that outcome), the threat assessment function 410 may assign a higher risk score and/or activate the threat recording function 440 to begin recording of video streams and/or other sensor data to capture the event (e.g., for insurance or other reporting purposes).

When the threat classification model 128 determines that a detected threat candidate is an animate being, such as a person or animal, other responses by the threat response system 140 may be appropriate. For example, where the threat classification model 128 determines that the threat candidate is an animal in close proximity to the vehicle 700, the threat assessment function 410 may generate and assign to the moving object 212 a high risk score that triggers the threat recording function 440 and/or the threat alter function 420. That is, the threat recording function 440 may begin recording video streams (e.g., based on sensor data 115) and/or other sensor data 105 to capture the event (e.g., for insurance or other reporting purposes), and/or the threat alert function 420 may activate exterior alarm devices (e.g., sirens and/or lights to frighten a threatening person or animal away).

In some embodiments, when a moving object 212 is identified by the threat classification model 128 as being a person, the threat classification model 128 may output a threat classification that further indicates a predicted intent of the person, which may be inferred based on body pose key-point estimation as discussed above. The threat classification model 128 may output a threat classification that indicates that a person does not have an intent that poses a threat to the vehicle 700. For example, based body pose key-point estimation of a person as shown in image 310 of FIG. 3, the threat classification model 128 may infer that the subject person 311 person intends to walk past vehicle 700. The threat assessment function 410 may assign a low threat score, which may not trigger any response, or may trigger the threat recording function 440 to log data from the instance. In contrast, the threat classification model 128 may instead assign a classification that indicates an approaching person does have an intent that poses a threat to the vehicle 700. For example, based on a body pose key-point estimation of a person 331 as shown in image 330 of FIG. 3, the threat classification model 128 may infer that the subject person 331 has a particular threatening intent (e.g., to contact or strike the vehicle, smash a window, open a vehicle door or hatch, and/or reach into the vehicle interior) and the threat assessment function 410 accordingly assigns a high risk score to that threat candidate.

A risk score may trigger the threat response system to perform one or more operations, such as triggering the threat recording function 440 to begin recording of video streams and/or other sensor data to capture the event, trigger the threat alert function 420 to activate external alarm devices, and/or to transmit notifications to a user device of the vehicle owner and/or a security service. As an example, as shown in FIG. 5, a threat alert function 420 may include one or more exterior alarms 510 and/or a threat notification function 512. In some embodiments, the threat alert function 420 may activate the one or more exterior alarms 510 and/or the threat notification function 512, for example, in response to a trigger from the threat assessment function 410 and/or otherwise based on a classification 135 from the external object detector 120.

In some embodiments, external alarms 510 may be selectively activated based on the threat classification assigned to the threat by threat classification model 128. For example, for a person near the vehicle 700 but otherwise deemed as benign, the threat alert function 420 may activate a first alarm level, such as a chirp or tone, to make the person more aware of their position with respect to the vehicle 700. For a person near the vehicle 700 assessed as a high risk threat, the threat alert function 420 may activate a second alarm level, such as a voice warning informing the threat that they have been detected and to caution against approaching any nearer to the vehicle 700. For a person near the vehicle 700 that is determined to be an imminent high risk threat (e.g., the threat classification model 128 has inferred that the person has initiated a high threat action such as striking the vehicle 700 or attempting to enter the vehicle 700), the threat alert function 420 may activate a third alarm level, which may include voice warnings, high decibel alarms, and/or flashing lights. Moreover, external alarms 510 may be selectively directed in the direction of the threat candidate by selectively activating external alarm devices based on a direction of a threat candidate's detected position with respect to the vehicle 700.

In some embodiments, threat notification function 512 may be selectively activated based on the threat classification assigned to the threat by threat classification model 128. For example, in some embodiments, the threat alert function 420 may be coupled to a network interface 520 (such as network interface 724 discussed with respect to FIG. 7A) to transmit notifications via a network 530 to a user device 540 (e.g., such as a smart phone and/or other personal smart device) designated by an operator of vehicle 700 to receive security notifications. Based on the level of risk posed by a threat candidate, the threat notification function 512 may transmit a notification to the user device 540. The notification to user device 540 may include one or more details regarding the threat candidate, including, for example, an indication of the threat classification assigned to the threat candidate, and/or sensor data such as an image of the threat candidate. In some embodiments, the threat alert function 420 may similarly transmit notifications via network interface 520 and network 530 to security services 542 designated by an operator of vehicle 700 to receive security notifications. The notification to security services 542 may include the location of the vehicle 700 in addition to one or more details regarding the threat candidate, including, for example, an indication of the threat classification assigned to the threat candidate, and/or sensor data such as an image of the threat candidate. In some embodiments, such notifications to user device 540 and/or security services 542 may include sensor data and/or streaming video of the event. Similarly, the sensor and image data may be selectively captured and/or recorded by the treat recording function 440.

In some embodiments, threat classifications 135 generated by the external object detector 120 may be used in conjunction with other functions, such as but not limited to an interior monitoring system 430 (e.g., such as occupant monitoring systems and/or child protection systems). For example, in some embodiments, in response to the threat classification and/or risk value assigned to a threat candidate, one or more elements of an interior monitoring system 430 may be activated to capture images and/or further assess the actions of the threat candidate.

For example, a threat classification 135 indicating that a threat candidate may intend to break into the vehicle 700 may cause the thread assessment function 410 to activate the interior monitoring system 430 to perform an object detector function using one or more interior sensors 431 (e.g., such as cameras and/or depth-perception sensors). In some embodiments, interior sensor 431 may comprise OMS sensor(s) 701 such as described with respect to FIG. 7A. That is, the interior monitoring system 430 may use cabin interior image data to compile an inventory of objects in the vehicle interior before and after a security event occurs. The inventory of objects may be used to identify specifically what items may have been removed during a vehicle break-in event. In some embodiments, the inventory of objects and/or other data captured by interior and/or exterior sensors, may be compiled by the interior monitoring system 430 into an intrusion report generated by the threat response system. In some embodiments, the intrusion report may provide data for further analysis after the event (e.g., documenting damage and/or stolen items, applying facial recognition, license tag recognition, or other evaluations). By triggering activation of the interior monitoring system 430 in response to risks associated with threat candidates identified by the external object detector 120, the sensors, neural network algorithms, and other processes of the internal monitoring system 430 may be triggered on an on-demand basis that conserves power until a threat is detected that actually warrants activation of those interior monitoring systems 430. In some embodiments, the interior monitoring system 430 may feed data back to the threat response system 140, which may further adjust risk values and/or execute response operations based on the interior monitoring system data. For example, the threat response system 140 may raise the risk value for a threat candidate to a higher risk value based on there being one or more items and/or a person (and/or pet), within the vehicle interior, as opposed to an empty interior.

In some embodiments, threat classifications generated by the threat classification model 128 may be used in conjunction with child protection functions of the interior monitoring system 430 (e.g., such as a child presence detection system that warn a driver when a child (and/or pet) may have been inadvertently left inside a parked vehicle). For example, in some embodiments, when the interior monitoring system 430 detects that a child may have been inadvertently left within the vehicle 700, the threat response system 140 may selectively activate exterior alarms and/or threat notification function 512 based at least on whether a high risk level threat candidate is detected outside the vehicle 700. In some embodiments, when the threat classification model 128 determines that a nearby threat candidate is a known person, and/or a person with non-threatening intent, the threat response system 140 may activate an external speaker in the direction of that person to alert them of the child and request assistance. In some embodiments, the threat classification model 128 can determine (e.g., through facial recognition) whether the nearby person is a family member and/or other non-threatening person registered with the vehicle 700. The response system may broadcast information regarding the location and/or contact information of the vehicle driver (e.g., based on a reported location of the vehicle driver's smart device 420), and/or other information such as the air temperature inside the vehicle. In other embodiments, if the threat classification model 128 identifies a threat candidate as a potential high risk threat to the vehicle and/or child detected by interior monitoring system 430, the threat response systems 140 may activate high decibel external alarms to bring attention to the area and/or encourage the threat candidate to leave the immediate area. The threat response system 140 may further trigger the threat recording function 440 to capture and record sensor data and/or interior and/or exterior images to document the encounter. In some embodiments, the threat assessment function 410 may adjust a risk score assigned to a threat candidate as a function of when a child (and/or pet) is detected in a vehicle by the interior monitoring 430.

In some embodiments, the interior monitoring system 430 may operate based at least on sensor data from interior sensors 431 that may include optical image sensor data and/or depth-perception sensor data that is used by an interior monitoring system 120 for various "in-cabin" interior monitoring functions such as, but not limited to, vehicle burglary protection, child and/or animal occupant detection (e.g., to prevent children or pets from accidentally being left alone in the vehicle), object detection (e.g., to detect the presence of packages, child or pet carriers, or other objects), activity monitoring, attentiveness monitoring, gaze prediction, digital assistant interaction monitoring (e.g., to monitor what a user is doing, where the user is looking, etc., for the purposes of generating context or contextual data to aid the assistant-which may be coupled with a digital avatar—in responding or communicating with the user), and/or other functions. Other interior monitoring functions performed by the interior monitoring system 430 may include, for example, identifying faces, facial landmarks, eye information, and/or other information of one or more occupants of the vehicle 700, identifying an occupant(s) based on facial features, and/or detecting gaze of an occupant(s) of the vehicle 700. Determinations and detections performed by the interior monitoring system 430 may be generated using one or more machine learning models and/or deep neural networks (DNNs). As an example, the interior monitoring system 430 may use optical image sensor data and/or depth-perception sensor data to predict the presence and/or location of occupants-such as objects, persons, and/or animals-within the interior space of the vehicle 700, wherein other systems of the vehicle 700 may determine one or more actions to take based on the predictions, and/or other tasks or operations.

For example, based on a combination of a threat classification from the external object detector 120 and/or risk level from the threat assessment function 410, and/or determinations about objects within the vehicle 700 interior by the interior monitoring system 430, an alarm or warning may be generated, door locks and/or windows may be operated, various functions may be turned on/off, data for a digital assistant, chat bot, digital avatar, and/or the like may be generated, and/or air conditioning or air circulation functions may be operated.

Now referring to FIG. 6, FIG. 6 is a flow diagram showing a method 600 for low power proximity based threat detection using optical flow, in accordance with some embodiments of the present disclosure. It should be understood that the features and elements described herein with respect to the method 600 of FIG. 6 may be used in conjunction with, in combination with, or substituted for elements of, any of the other embodiments discussed herein and vice versa. Further, it should be understood that the functions, structures, and other descriptions of elements for embodiments described in FIG. 6 may apply to like or similarly named or described elements across any of the figures and/or embodiments described herein and vice versa.

Each block of method 600, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, method 600 is described, by way of example, with respect to the low power proximity based threat detection system of FIG. 1. However, these methods may additionally or alternatively be executed by any one system, or any combination of systems, including, but not limited to, those described herein.

As discussed herein in greater detail, the method may include inferring a threat classification for an object in an environment corresponding to an ego-machine based at least on image sensor data, the threat classification computed in response to the object reaching a threshold proximity to the ego-machine as determined based at least on optical flow computations based at least on the image sensor data.

The method 600, at block B602, includes generating optical flow data based at least on image sensor data depicting an environment. In some embodiments, an optical flow processor inputs sequential image frames from the image sensor data to determine an origin of optical flow corresponding to a moving object appearing in the image frames. The method 600, at block B604, includes detecting, based on the optical flow data, one or more moving objects in the environment. For example, the optical flow processor may calculate one or more flow vectors indicating motion between two sequential image frames with respect to voxel positions. This origin of optical flow for a moving object may also be referred as the focus of expansion that defines a point where optical flow is minimal and from which an optical flow vector appears to originate. In some embodiments, the optical flow is defined as flowing in a direction away from the focus of expansion. In some implementations, the focus of expansion in an image may be determined by finding common intersection points of individual flow vectors in the image. The optical flow processor computes a length of the optical flow vectors to estimate a velocity of image pixels corresponding to the moving object, and the distance from the pixel to the focus of expansion provides a value corresponding to a relative depth. With these two values, a scaled depth value (which may be referred to as a time-to-contact quantity) may be computed and used as a proxy for relative depth of various segments in the image.

The method 600, at block B606, includes tracking a relative depth of the one or more moving objects. Optical flow computations may generate optical flow vectors that represent estimates of the relative depth of moving object in an image. Tracking the relative depth can be used to segment a closest moving object in the scene, and to track that object as a threat candidate over a sequence of image frames. In some embodiments, a scaled depth image (e.g., such as a time-to-contact image) may be generated corresponding to the image sensor data based at least on the optical flow. A depth and velocity of pixels in the scaled depth image may be determined corresponding to the one or more moving objects in the scaled depth image, and one or more moving objects in the scaled depth image may be detected based at least in part on the depth and velocity of the pixels in the scaled depth image, and the depth sensor data received from one or more depth sensors.

The method 600, at block B608, includes determining a distance of the one or more moving objects from an ego-machine based on at least one of the relative depth or the depth sensor data. The depth sensor data may be received from one or more depth sensors comprising one or more of: at least one ultrasonic sensor, at least one depth-sensing camera, or at least one LiDAR sensor. One or more depth sensors may be activated to generate the depth sensor data based at least on the relative depth of the one or more moving objects (e.g., threat candidates) determined based at least on the optical flow.

The method 600, at block B610, includes generating a threat classification for the one or more moving objects based at least on the image sensor data and the distance of the one or more moving objects. In some embodiments, the threat classification model may be activated to infer the threat classification based at least on the image sensor data. The threat classification model may be activated based at least on the distance reaching a threshold. In some embodiments, the threat classification may be generated using a threat classification model to infer the threat classification based at least on the image sensor data. In some embodiments, the threat classification model may include a body pose model that generated the threat classification based at least on a predicted intent of the person inferred from body poses.

The method 600, at block B612, includes performing one or more operations (e.g., threat response operations) based at least on the threat classification. In some embodiments, activation of a data recording system (e.g., threat recording function 440) and/or activation of an alarm system (e.g., threat alert function 420) may be triggered based at least on the threat classification. A notification message may be triggered based at least on the threat classification. In some embodiments, an inventory of objects within a vehicle interior may be generated using one or more interior sensors based at least on the threat classification. In some embodiments, the method may include detecting when an object is within the vehicle interior. An alert may be generated, for example, based at least on the threat classification and the detection of the object within a vehicle interior by one or more interior sensors. For example, the alert may be generated based at least on the threat classification and a classification of the object as a person or an animal based at least on sensor data from at least the one or more interior sensors.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation, autonomous or semi-autonomous machine applications, deep learning, environment simulation, object or actor simulation and/or digital twinning, data center processing, conversational AI, generative AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing generative AI operations using a language model, systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Example Autonomous Vehicle

Figure 7A:
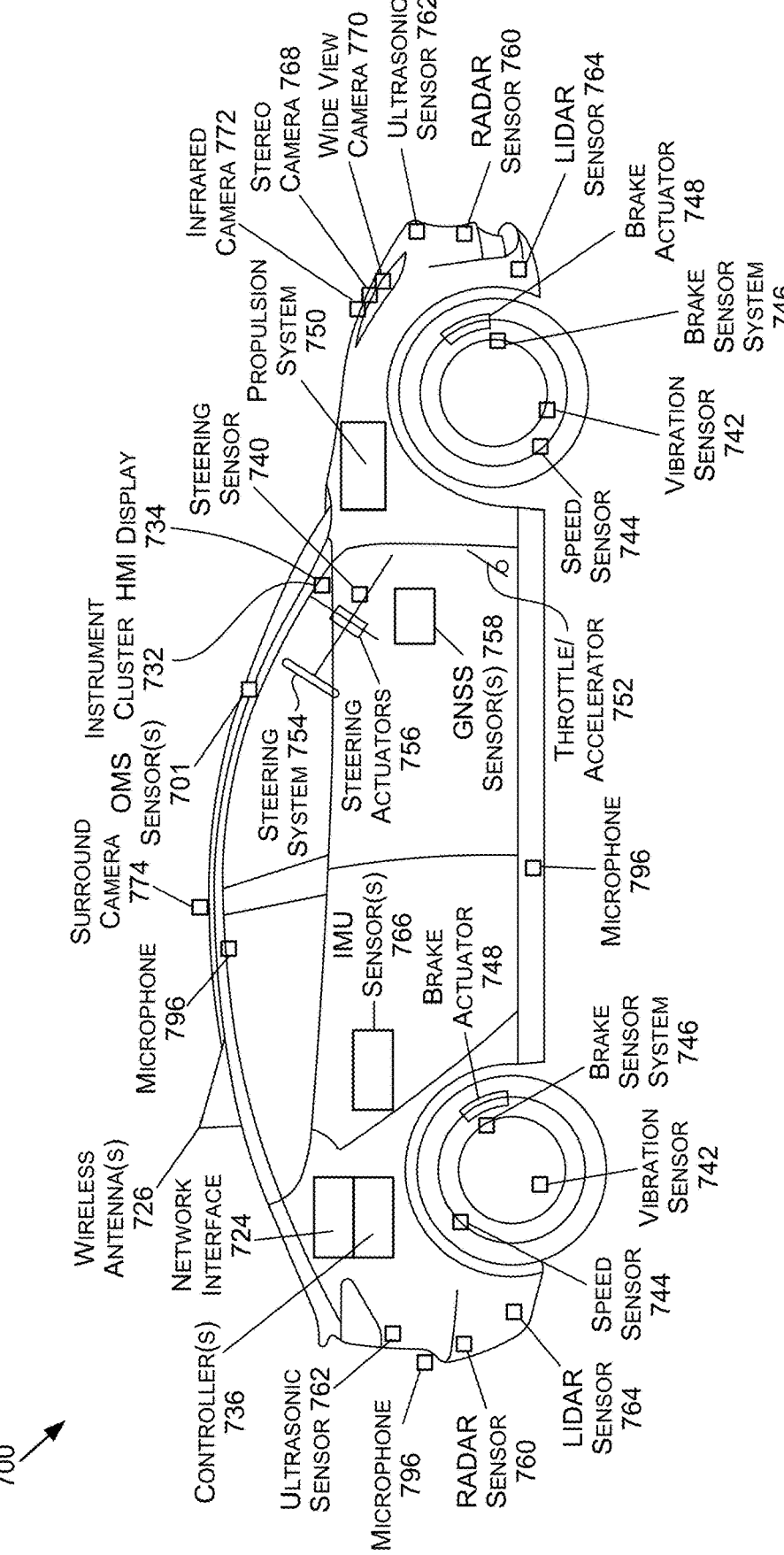
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. The vehicle 700 may be capable of functionality in accordance with one or more of Level 1-Level 5 of the autonomous driving levels. For example, the vehicle 700 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 700 or other machine, such as being fully autonomous, being highly autonomous, being conditionally autonomous, being partially autonomous, providing assistive autonomy, being semi-autonomous, being primarily autonomous, or other designation.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type.

The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof. In some embodiments, external object detector 120 and/or threat response system 140 may at least in part be executed by one or more of the controller(s) 736.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems ("GNSS") sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), one or more occupant monitoring system (OMS) sensor(s) 701 (e.g., one or more interior cameras), and/or other sensor types. In some embodiments, audio data 111, image data 115 and/or depth data 119 may be generated at least in part by such sensors.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the High Definition ("HD") map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 726 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc. In some embodiments, network interface 520 is implemented using network interface 724.

Figure 7B:
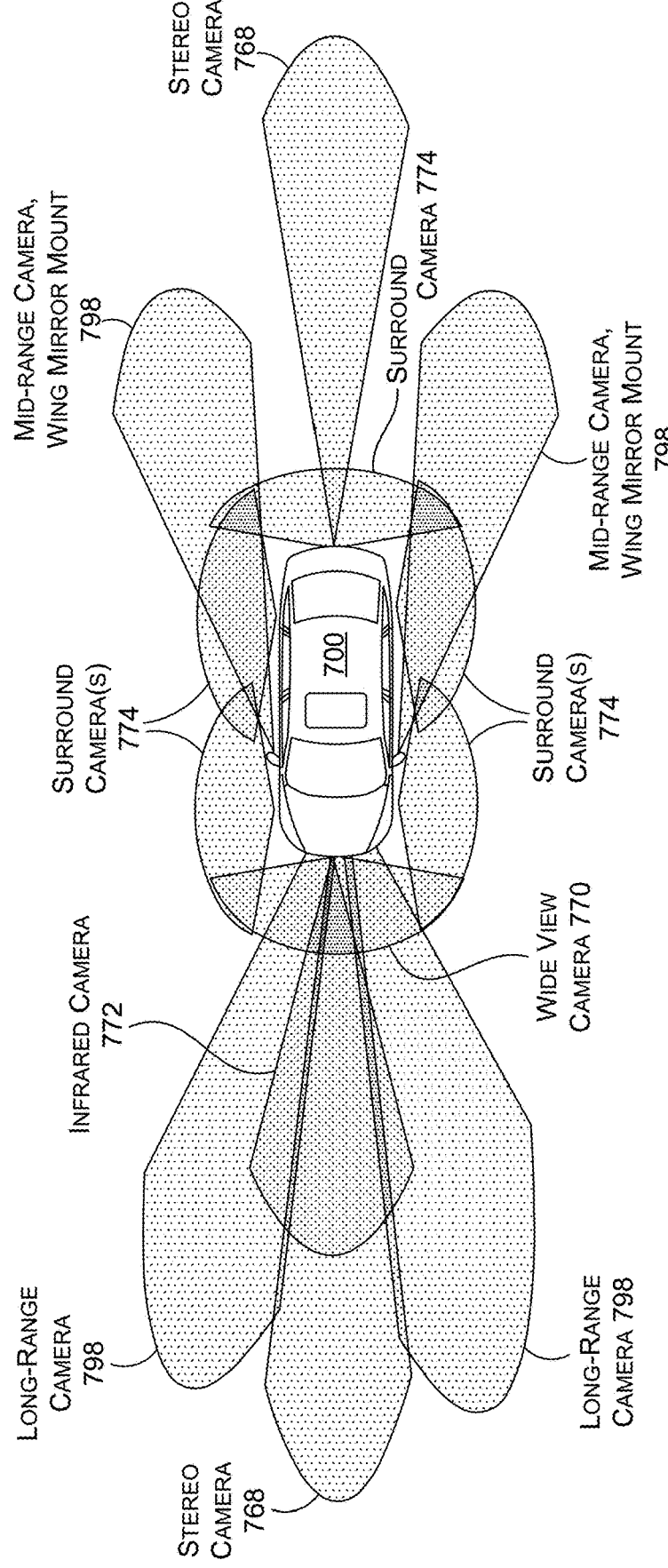
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may be any number (including zero) of wide-view cameras 770 on the vehicle 700. In addition, any number of long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking. In some embodiments, image data 115 and/or depth data 119 may be generated using one or more of the cameras illustrated with respect to FIGS. 7A and 7B.

Any number of stereo cameras 768 may also be included in a front-facing configuration. In at least one embodiment, one or more of stereo camera(s) 768 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Cameras with a field of view that include portions of the interior environment within the cabin of the vehicle 700 (e.g., one or more OMS sensor(s) 701) may be used as part of an occupant monitoring system (OMS) such as, but not limited to, a driver monitoring system (DMS). For example, OMS sensors (e.g., the OMS sensor(s) 701) may be used (e.g., by the controller(s) 736) to track an occupant's and/or driver's gaze direction, head pose, and/or blinking. This gaze information may be used to determine a level of attentiveness of the occupant or driver (e.g., to detect drowsiness, fatigue, and/or distraction), and/or to take responsive action to prevent harm to the occupant or operator. In some embodiments, data from OMS sensors may be used to enable gaze-controlled operations triggered by driver and/or non-driver occupants such as, but not limited to, adjusting cabin temperature and/or airflow, opening and closing windows, controlling cabin lighting, controlling entertainment systems, adjusting mirrors, adjusting seat positions, and/or other operations. In some embodiments, an OMS may be used for applications such as determining when objects and/or occupants have been left behind in a vehicle cabin (e.g., by detecting occupant presence after the driver exits the vehicle), or other occupant monitoring functions such as performed by interior monitoring 430 and/or interior sensor(s) 431.

Figure 7C:
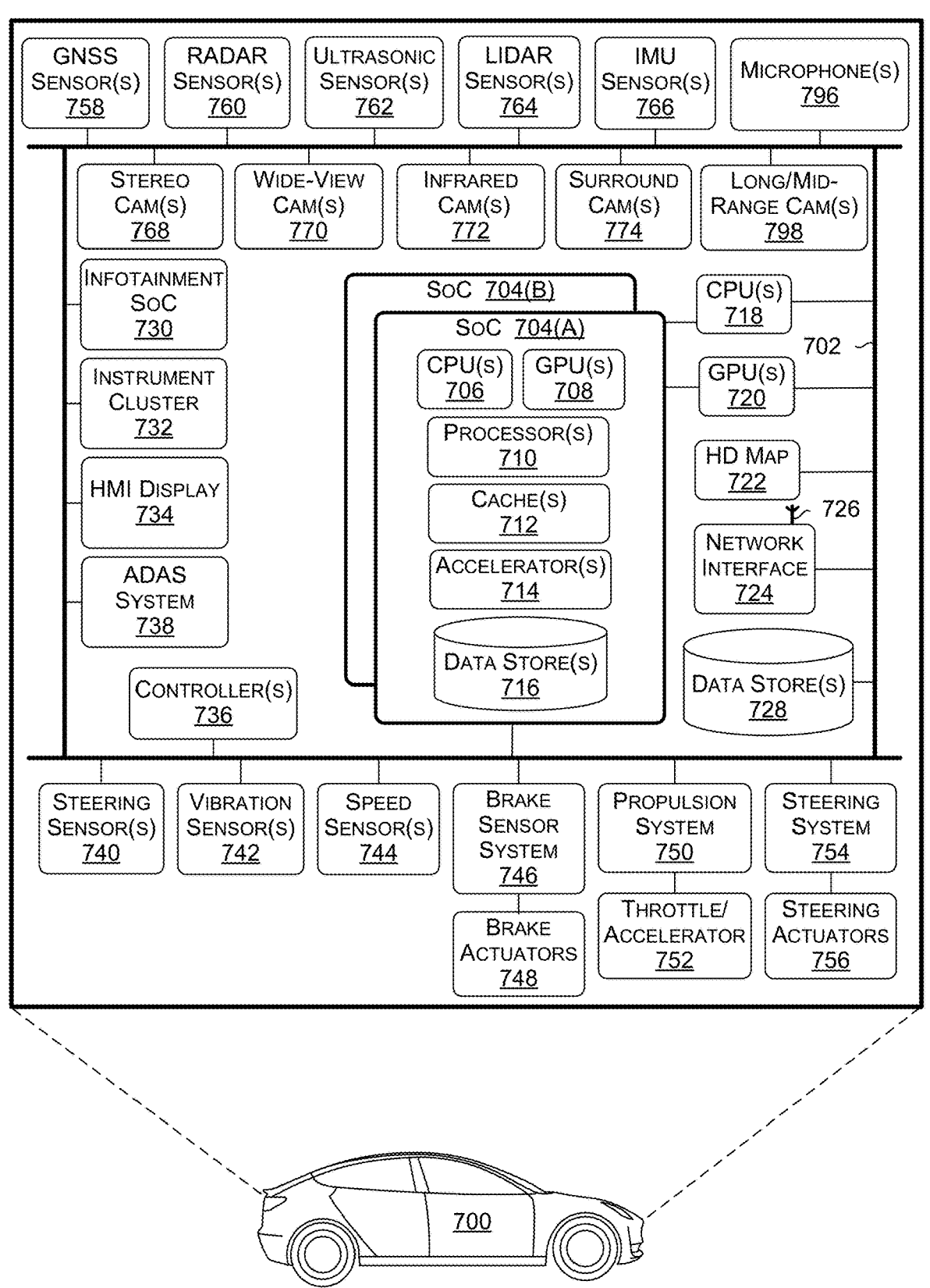
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))— or other math coprocessor or numeric coprocessor types— for performing mathematical operations within the system. For example, the SoC(s) 104 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 712 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex. In some embodiments, one or more functions of the threat classification model 128 discussed herein are implemented by at least one neural network executed on one or more of the GPU(s) 720.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK). The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS, assisted GPS sensors, differential GPS (DGPS) sensors, etc.), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 120-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(H) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
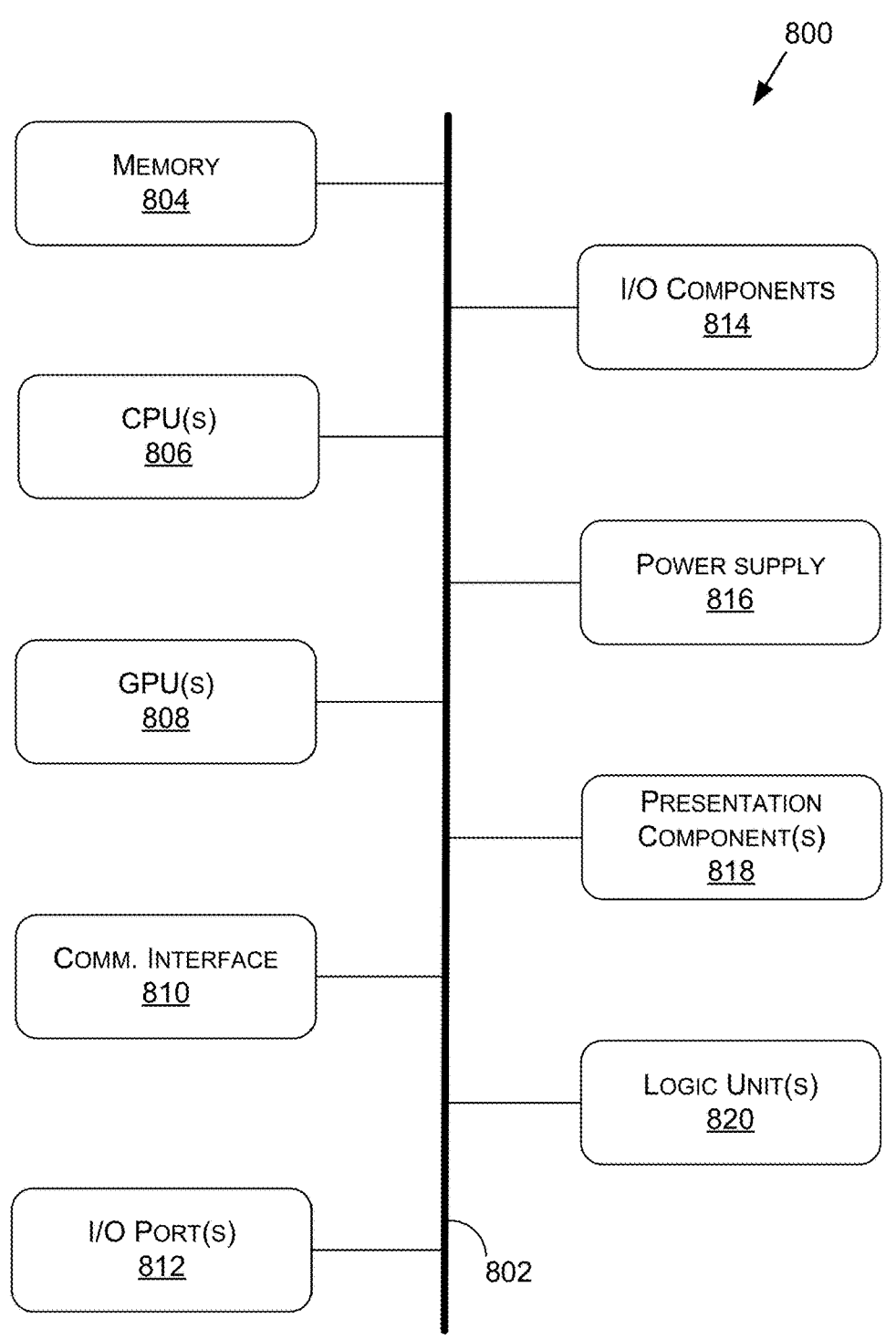
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device

800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof. In some embodiments, one or more functions of the external object detector 120 and/or threat response system 140 may at least in part be executed by one or more of the CPU(s) 806. In some embodiments, one or more functions of the threat classification model 128 discussed herein are implemented by at least one neural network executed on one or more of the GPU(s) 808.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
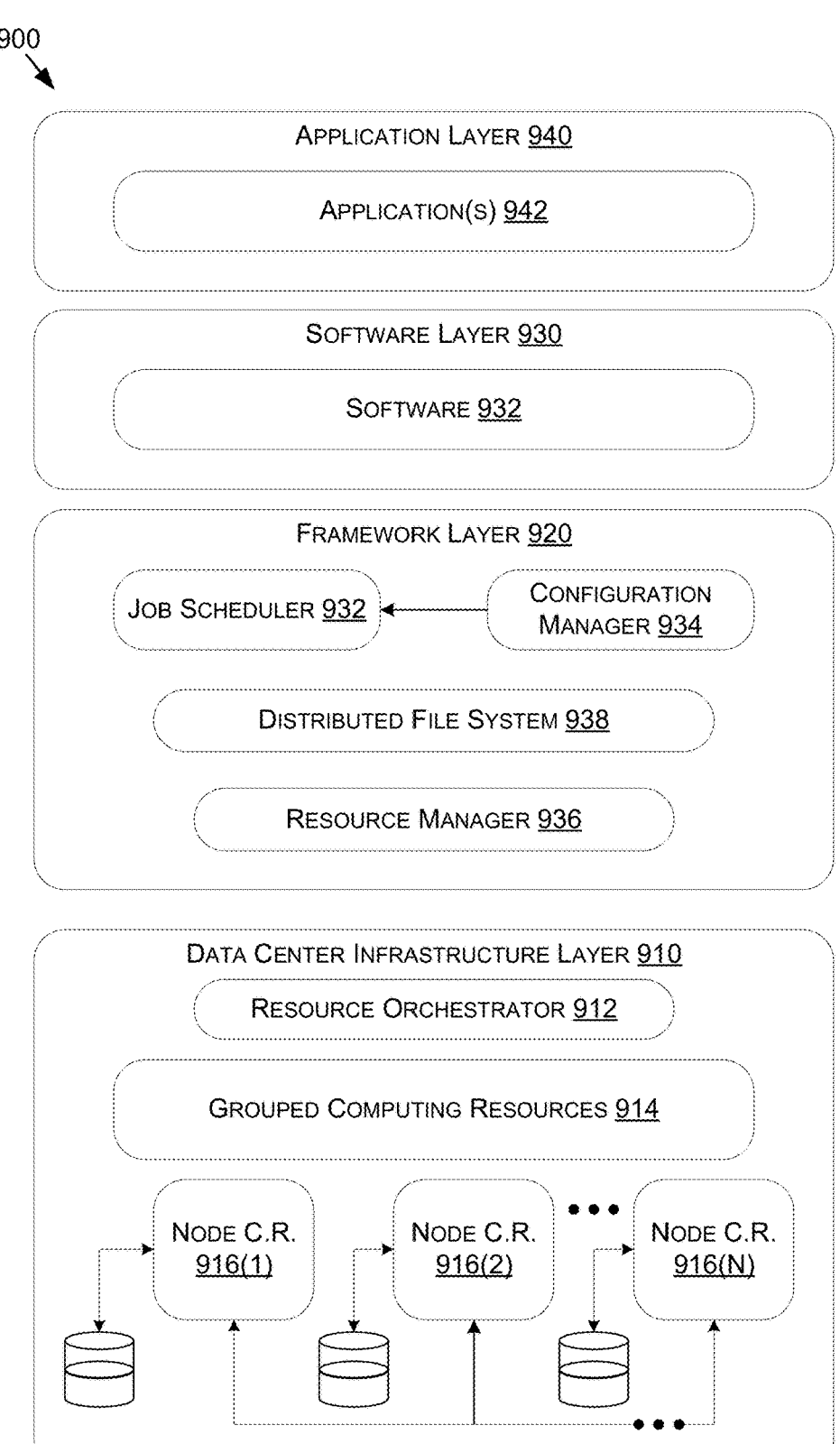
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916 (N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM). In some embodiments, external object detector 120, threat response system 140, and/or threat classification model 128, may at least in part be executed by one or more of the node C.R.s 916(1)-916(N).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 933, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 933 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 933. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916 (N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A system comprising:
one or more processing units to:
track a relative depth of one or more moving objects based at least on optical flow data generated based at least on image sensor data depicting an environment;
based at least on the relative depth reaching a first threshold, selectively activate one or more depth sensors to generate depth sensor data;
based at least on the depth sensor data indicating the one or more moving objects reaching a second threshold, trigger an activation of a machine learning model to:
segment the image sensor data to discern voxels for at least one threat candidate using the depth sensor data in conjunction with the optical flow data; and
generate a threat classification for the at least one threat candidate; and
perform one or more operations based at least on the threat classification.

2. The system of claim 1, the one or more processing units further to:
obtain audio data from one or more audio sensors; and
generate the threat classification further based on the audio data.

3. The system of claim 1, the one or more processing units further to:
determine, based at least on the depth sensor data, a distance to a closet object within an arc of a field of view of the one or more depth sensors, and correlate the distance with a closest moving segment of the image sensor data.

4. The system of claim 1, the one or more processing units further to:
   activate a threat classification model to infer the threat classification based at least on detecting a relative position or movements of key points on a human body using the image sensor data.

5. The system of claim 4, wherein the threat classification model is activated based at least on the distance between at least one of the one or more moving objects and the ego-machine reaching a threshold.

6. The system of claim 4, the one or more processing units further to:
   infer an intent associated with the one or more moving objects based at least on a body pose model; and
   generate the threat classification further based on the intent inferred by the body pose model.

7. The system of claim 1, the one or more processing units further to trigger an operation that includes at least one of:
   trigger activation of a data recording system based at least on the threat classification;
   trigger activation of an alarm system based at least on the threat classification; or
   transmit a notification message based at least on the threat classification.

8. The system of claim 1, the one or more processing units further to:
   generate an inventory of objects within an interior of the ego-machine using one or more interior sensors based at least on the threat classification.

9. The system of claim 1, the one or more processing units further to:
   generate an alert based at least on the threat classification and a detection of an object within an interior of the ego-machine by one or more interior sensors.

10. The system of claim 1, the one or more processing units further to:
   generate a scaled depth image corresponding to the image sensor data based at least on the optical flow data;
   determine a depth and velocity of pixels in the scaled depth image corresponding to the one or more moving objects in the scaled depth image; and
   detect the one or more moving objects in the scaled depth image based at least in part on the depth and velocity of the pixels in the scaled depth image, wherein the depth sensor data is received from one or more depth sensors.

11. The system of claim 1, wherein the system is comprised in at least one of:
   a control system for an autonomous or semi-autonomous machine;
   a perception system for an autonomous or semi-autonomous machine;
   a system for performing simulation operations;
   a system for performing digital twin operations;
   a system for performing light transport simulation;
   a system for performing collaborative content creation for 3D assets;
   a system for generating or presenting at least one of virtual reality content, augmented reality content, or mixed reality content;
   a system for performing deep learning operations;
   a system for performing real-time streaming;
   a system implemented using an edge device;
   a system implemented using a robot;

a system for performing conversational AI operations;
   a system for generating synthetic data;
   a system incorporating one or more virtual machines (VMs);
   a system implemented at least partially in a data center;
   a system for performing generative AI operations;
   a system implemented at least partially using a language model; or
   a system implemented at least partially using cloud computing resources.

12. A processor comprising:
   one or more processing units to:
   track movement of one or more threat candidates based at least on optical flow data computed using image sensor data received from one or more image sensors, the image sensor data depicting an environment corresponding to an ego-machine;
   determine at least a distance of the one or more threat candidates to the ego-machine based at least on depth sensor data received from one or more depth sensors;
   based at least on the depth sensor data indicating the one or more moving objects reaching a second threshold, trigger an activation of a machine learning model to segment the image sensor data to discern voxels for at the least one threat candidate using the depth sensor data in conjunction with the optical flow data;
   generate a threat classification for the at least one threat candidate based at least on the image sensor data and the distance of the one or more threat candidates; and
   perform one or more operations based at least on the threat classification.

13. The processor of claim 12, wherein the one or more processing units are further to:
   infer the threat classification using a threat classification model based at least on the image sensor data.

14. The processor of claim 12, wherein the one or more processing units are further to:
   determine, based at least on the depth sensor data, a distance to a closet object within an arc of a field of view of the one or more depth sensors, and correlate the distance with a closest moving segment of the image sensor data.

15. The processor of claim 12, wherein the one or more processing units are further to:
   generate an inventory of objects within an interior of the ego-machine using one or more sensors based at least on the threat classification; and
   generate an intrusion report based on the inventory of objects.

16. The processor of claim 12, wherein the one or more processing units are further to:
   detect when an object is within an interior of the ego-machine; and
   perform the one or more operations based at least on the threat classification and detection of the object within the interior of the ego-machine.

17. The processor of claim 12, wherein the one or more processing units are further to:
   detect when a child is present within an interior of the ego-machine; and
   perform the one or more operations based at least on the threat classification and detection of the child within the interior of the ego-machine.

18. The processor of claim 12, wherein the one or more processing units are further to:
   generate a scaled depth image corresponding to the image sensor data based at least on the optical flow data;

determine a depth and velocity of pixels in the scaled depth image corresponding to one or more moving objects in the scaled depth image; and detect the one or more threat candidates in the scaled depth image using the depth and velocity, and the depth sensor data received from the one or more depth sensors.

19. The processor of claim 12, wherein the processor is comprised in at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for generating or presenting at least one of virtual reality content, augmented reality content, or mixed reality content;

a system for performing deep learning operations;

a system for performing real-time streaming;

a system implemented using an edge device;

a system implemented using a robot;

a system for performing conversational AI operations;

a system for generating synthetic data;

a system incorporating one or more virtual machines (VMs);

a system implemented at least partially in a data center;

a system for performing generative AI operations;

a system implemented at least partially using a language model; or a system implemented at least partially using cloud computing resources.

20. A method comprising:

inferring a threat classification for an object in an environment corresponding to an ego-machine based at least on image sensor data, the threat classification computed in response to the object reaching a threshold proximity to the ego-machine as determined based at least on optical flow computations based at least on segmenting the image sensor data using a machine learning model to discern voxels for the object using depth sensor data in conjunction with optical flow data.

* * * * *